United States Patent [19]

Forkner

[11] Patent Number: 4,623,225

[45] Date of Patent: Nov. 18, 1986

[54] ANAMORPHIC PRISM FOR BEAM SHAPING

[75] Inventor: John F. Forkner, South Laguna, Calif.

[73] Assignee: Melles Griot, Irvine Company, Irvine, Calif.

[21] Appl. No.: 626,135

[22] Filed: Jun. 29, 1984

[51] Int. Cl.[4] ............................................. G02B 13/10
[52] U.S. Cl. ..................................... 350/421; 350/286
[58] Field of Search ......................... 350/6.4, 286, 421

[56] References Cited

U.S. PATENT DOCUMENTS

| | | | |
|---|---|---|---|
| 2,780,142 | 2/1957 | Bouwers | 350/420 |
| 3,603,726 | 9/1971 | Garber et al. | 350/421 |
| 4,059,343 | 11/1977 | Kowalski et al. | 350/421 |
| 4,084,881 | 4/1978 | Hirabayashi et al. | 350/421 |
| 4,203,652 | 5/1980 | Hanada | 350/421 |
| 4,410,237 | 10/1983 | Veldkamp | 350/421 |

OTHER PUBLICATIONS

J. R. Meyer-Arendt, *Introduction to Classical and Modern Optics*, Prentice-Hall (1972), pp. 19-20.

"Laser Diode Optics," Melles Griot (undated).
"Collimator Pen," Amperex Electronic Corporation (undated).
"CQL10 Semiconductor Laser for Information Readout," Electronic Components and Applications, vol. 3, No. 1, Nov. 1980.
"A Low Cost High Precision Envelope for a Diode Laser," Amperex Electronic Corporation (undated).

*Primary Examiner*—John K. Corbin
*Assistant Examiner*—Rebecca D. Gass
*Attorney, Agent, or Firm*—Knobbe, Martens, Olson & Bear

[57] ABSTRACT

A device for shaping a beam of light comprising a single anamorphic prism having an input face for receiving a beam of light, and an output face for outputting the beam of light. A reflecting face reflects light from the input face to the output face. The faces are oriented to cause the beam exiting the output face to be substantially parallel to the beam entering the input face. The prism is sized to provide colinearity of the input and output light.

27 Claims, 16 Drawing Figures

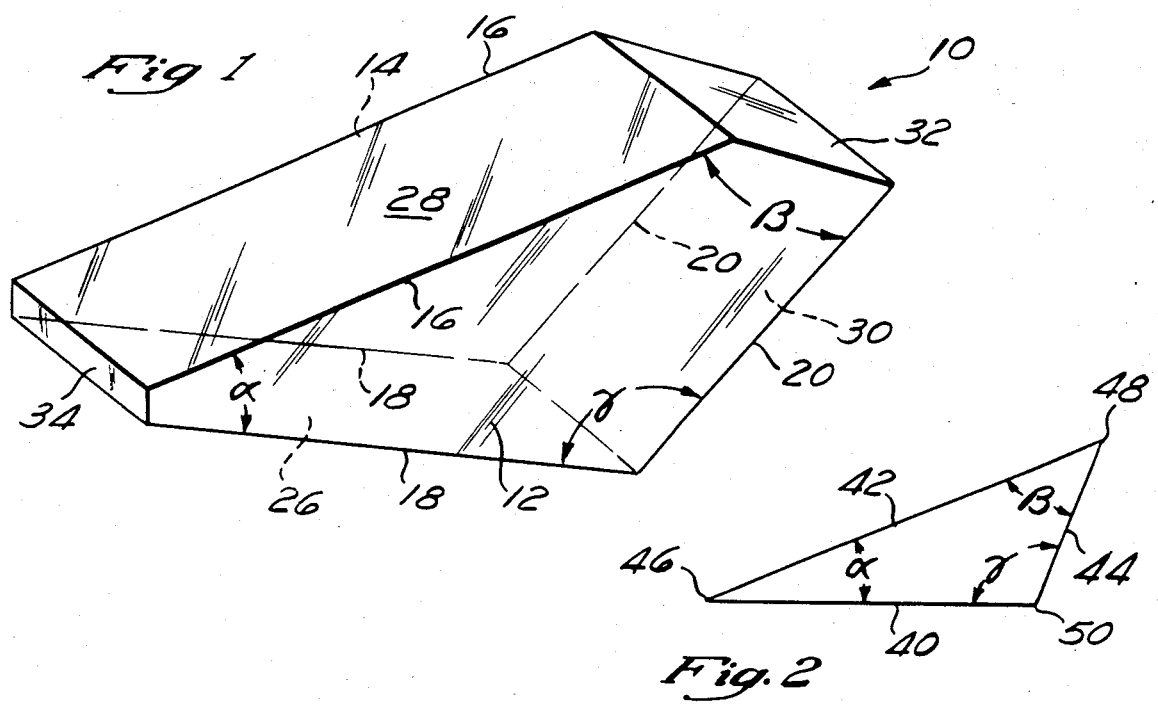
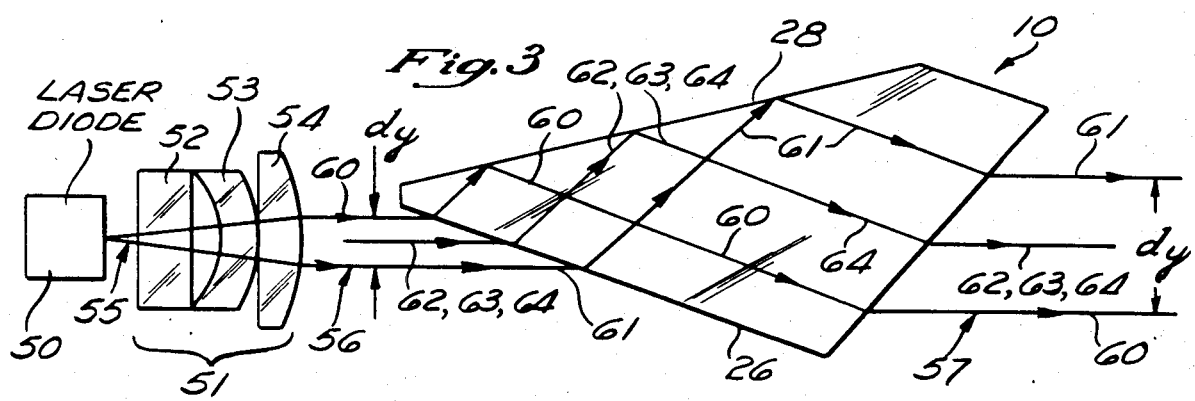
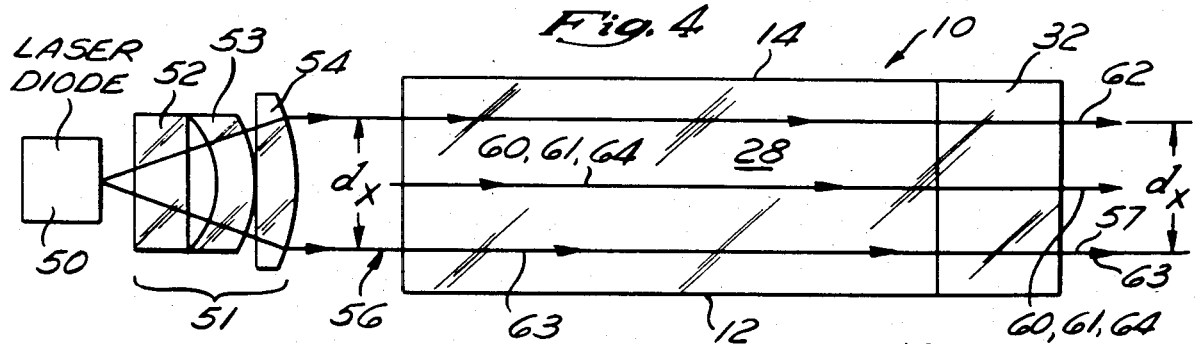
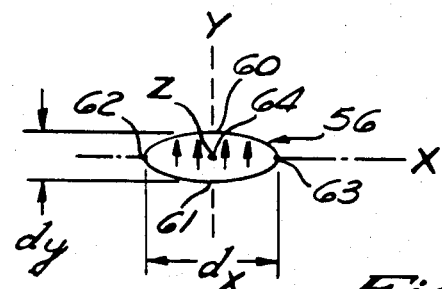
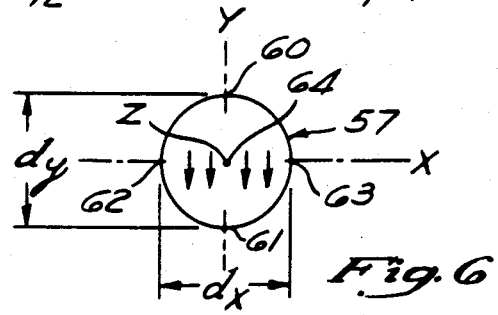

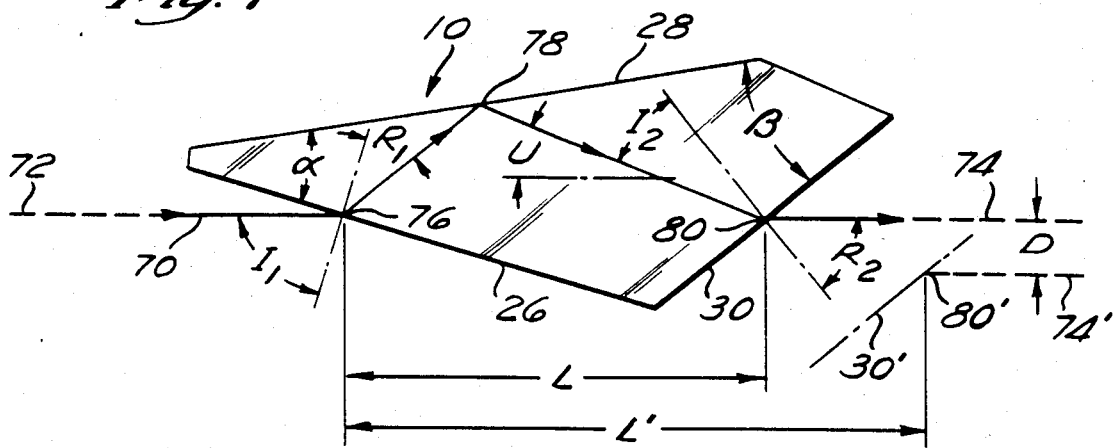
Fig. 7
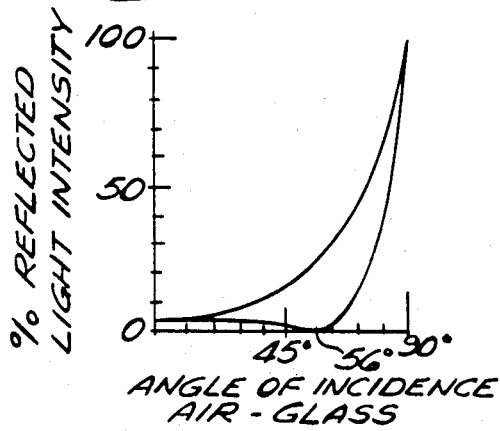
Fig. 8
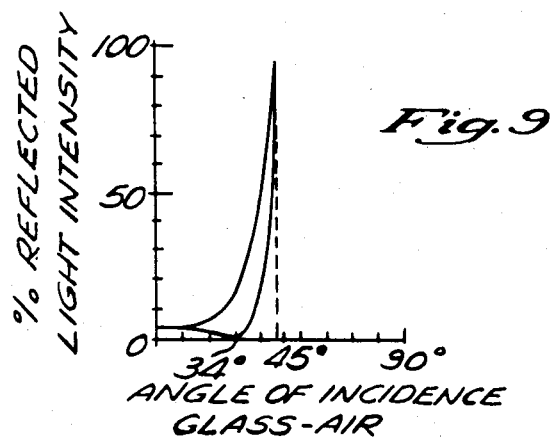
Fig. 9
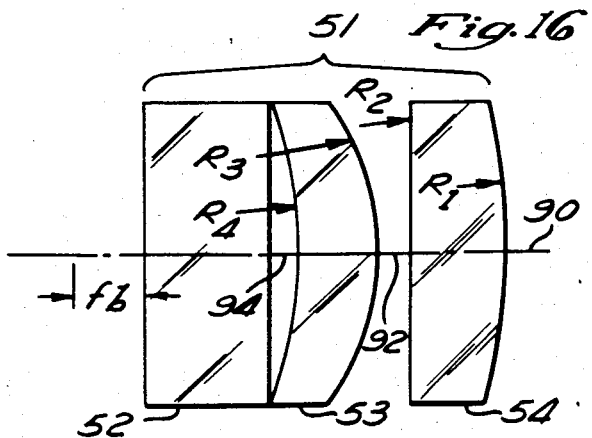
Fig. 10
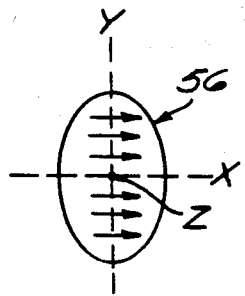
Fig. 11
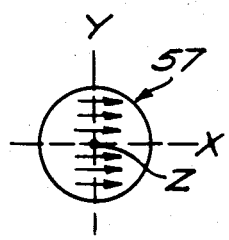
Fig. 12
Fig. 16

ANAMORPHIC PRISM FOR BEAM SHAPING

BACKGROUND

The present invention relates to devices for shaping light beams, and more particularly to anamorphic prisms for shaping light beams.

Light beam shaping devices are commonly utilized in connection with laser diodes. The geometry of the emitting area of a laser diode is typically nonsymmetrical such that the light emitted from the diode is cross-sectionally elliptical. Usually the major axis of the elliptical cross-section light is about twice that of the minor axis, and thus, the orthogonal dimensions of the light typically have a ratio of about two to one. It is advantageous in a variety of applications to reshape the elliptical cross-section light to a circular cross-section through use of a shaping device. Ordinarily, the shaping device is used in combination with a collimator so that the output light is not only reshaped, but also collimated.

Prior art beam shaping devices may be broadly classified into two categories, namely, lenses and prisms. Lens systems are advantageous in that they not only maintain the direction of the input beam, but also maintain colinearity between the input and the output beam, such that they lie along a common axis. However, lens systems typically involve the forming of complex surfaces which require precise manufacturing tolerances, and thus they are quite expensive to manufacture. Further, the optical elements associated with lens systems must be maintained in relatively precise alignment for proper operation. Prism systems, on the other hand, are less expensive to manufacture, but typically do not provide colinearity of the input and output beams. Further, in prior art systems, it is necessary to utilize at least two separate prisms to maintain the direction of the input and output beams. These prism systems, therefore, require multiple optical elements and thus also suffer from alignment problems, although the tolerances are typically less than for the lens systems.

Accordingly, there is a need in the art for a prismatic shaping device which reduces alignment problems, and maintains the direction of the input and output beams, as well as providing colinearity of such input and output beams.

SUMMARY OF THE INVENTION

The present invention comprises a single unitary anamorphic prism for shaping a beam of light through anamorphic magnification to transform it, e.g. from an elliptical cross section to a circular cross section. The prism has an input surface or face for receiving a beam of light and an output face for outputting the beam of light. The faces are oriented to cause the beam exiting at the output face to be substantially parallel to the beam entering the input face, such that the direction of the light beam is maintained. Preferably, the orientation of the surfaces is further selected to cause the beam at the output face to be substantially colinear with the beam at the input face, so that both the input and output beams lie along a common line or axis.

The prism of the preferred embodiment has three "active" faces which process the beam of light. As used herein, the term "active faces" is defined as those prism faces upon which the light beam is incident, and which function to process the beam of light, as opposed to "inactive faces" upon which the light beam is not incident, and which have no effect on the processing of the light beam. In the preferred embodiment, two of the prisms' active faces are transmissive, while one is reflective. The two transmissive surfaces refract the light beam to cause magnification, while the reflective surface reflects the light received from one of the transmissive surfaces for propagation to the other of the transmissive surfaces. It will be understood that very few surfaces are perfectly transmissive or reflective, and thus, the terms "transmissive" and "reflective" will be used herein according to their common, ordinary meaning, i.e. primarily transmissive, or primarily reflective, respectively.

The term "magnification" is used herein in a generic sense as referring to either expansion or compression of an image or beam of light. The expansion of light will be referred to as "expansive magnification", while the compression of light will be referred to as "compressive magnification". The present invention may be converted from one type of magnification (i.e. expansive or compressive) to the other simply by reversing the direction of the light input through the prism and rotating the prism 90°, relative to the input light, about an axis parallel to the input light beam. In the preferred embodiment, the magnification (both expansive and compressive) is anamorphic, that is, the magnification of the light beam is greater in one dimension, than in the orthogonal dimension. Thus, an elliptical cross-section light beam may be transformed to circular either by orienting the beam relative to the prism for expansive magnification along the smaller dimension (i.e., axis) of the ellipse, or compressive magnification along the larger dimension (i.e., major axis) of the ellipse.

A significant advantage of the present invention is that the prism comprises only a single optical element, and thus, the invention avoids the alignment problems associated with prior art beam shaping devices. Further, the prism has no complex surfaces, and is relatively inexpensive to manufacture.

A further advantage of the present invention is that the active faces of the prism may be oriented relative to the incoming light beam such that no coatings of any kind, i.e. either reflection coatings or anti-reflection coatings, are required.

DESCRIPTION OF DRAWINGS

These and other features of the present invention are best understood through reference to the drawings, in which:

FIG. 1 is a perspective view of the anamorphic prism of the present invention;

FIG. 2 is a schematic drawing showing three mutually intersecting planes which correspond to the active surfaces of the prism of FIG. 1;

FIG. 3 is an elevation view of the prism of FIG. 1, showing the prism oriented to cause an elliptically-shaped input light beam to be transformed into a circularly-shaped output light beam, and illustrating a collimator for collimating light from a laser diode for input to the prism;

FIG. 4 is a plan view of the device of FIG. 3;

FIG. 5 is a schematic drawing illustrating the elliptical cross-sectional shape of the light beam input to the prism in FIGS. 3 and 4;

FIG. 6 is a schematic drawing showing the circular cross-sectional shape of the light beam output from the prism in FIGS. 3 and 4;

FIG. 7 is a schematic drawing of the anamorphic prism of the present invention, illustrating the effect of prism length on colinearity of the input and output light beams;

FIG. 8 is a graph of reflected light intensity as a function of the angle of incidence for an air-to-glass boundary;

FIG. 9 is a graph of reflected light intensity as a function of angle of incidence for a glass-to-air boundary;

FIG. 10 is an elevation view of the prism of the present invention oriented for compression of the elliptical cross-section input light beam to transform the input light beam into a circular cross-section output light beam;

FIG. 11 is a schematic drawing showing the orientation of the elliptical cross-section input light in FIG. 10;

FIG. 12 is a schematic drawing showing the circular cross-section output light of the device of FIG. 10;

FIG. 16 is an enlarged elevation view showing the three optical elements which form the collimator.

DETAILED DESCRIPTION OF THE PREFERRED EMBODIMENT

Figure 13:
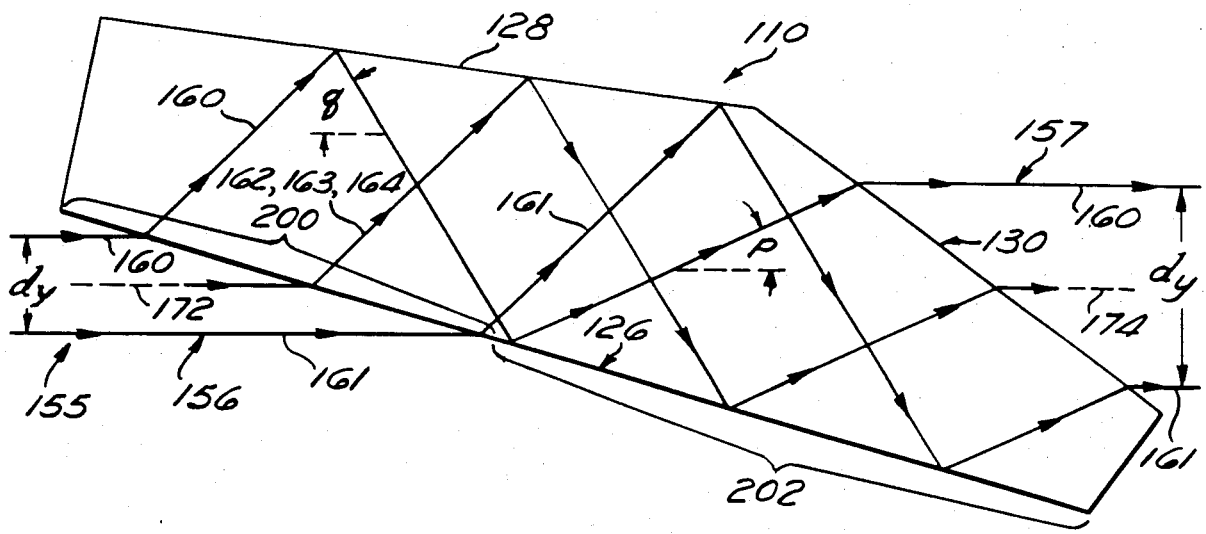
FIG. 13 is an elevation view of an alternative embodiment of the prism of the present invention.

As shown in FIG. 1, the present invention comprises an anamorphic prism. In the preferred embodiment, the prism has generally triangular sides 12, 14, respectively. The sides 12, 14 each include a hypotenuse edge 16 and side leg edges 18, 20. The side leg edge 18 forms an acute angle α with the hypotenuse edge 16, while the side leg edge 20 forms an acute angle β with the hypotenuse edge 16. The side leg edges 18, 20 form an obtuse angle γ with each other. The generally triangular faces 12, 14, in the embodiment shown, are identical to each other and parallel to each other.

The prism 10 also includes a first planar surface 26, between the side leg edges 18, a second planar surface 28, between the hypotenuse edges 16, and a third planar surface 30, between the side leg edges 20. The three planar surfaces 26, 28 and 30 form the active faces of the prism 10. In the embodiment shown, the faces 26, 28, and 30 are rectangular and optically flat.

As shown in FIG. 1, the triangularly shaped side faces 12, 14 of the prism of the preferred embodiment are truncated at the vertex formed by the angle α, between the edges 16, 18, and at the vertex formed by the angle γ, between the edges 16, 20. The purpose of such truncation is to reduce the overall dimensions of the prism to make the prism compact. The truncation forms surfaces 32, 34 which are inactive, in that they do not function to transmit or reflect light, as opposed to the surfaces 26, 28, 30, which are active surfaces, in that they do function to transmit or reflect light. The prism shown in FIG. 1 is formed from a transparent, homogeneous, isotropic material such as glass.

It will be understood that the discussion in reference to FIG. 1 applies to the preferred embodiment, and that the prism 10 may be configured to have a somewhat different appearance from that shown in FIG. 1. Referring to FIG. 2, the basic requirements for the prism 10 of the preferred embodiment is that the active surfaces 26, 28, 30 lie in mutually intersecting planes 40, 42, 44, respectively, and that two of the planes 40, 44 intersect at an obtuse angle, e.g. γ. The planes 40, 42 are shown in FIG. 2 as intersecting along a line of intersection 46, the planes 42 and 44 along a line of intersection 48, and the planes 40, 44 along a line of intersection 50. Preferably, the lines of intersection 46, 48, and 50 of the planes 40, 42, 44 should be parallel to one another, so as to avoid distortion of the optical image as light passes through the prism 10.

The preferred use for prism 10 is in an optical shaping device, shown in FIGS. 3 and 4. In addition to the prism, the shaping device comprises a source, such as a laser diode 50, and a collimator 51, comprised of three optical elements, 52, 53, 54, for collimating a source light beam 55 from the laser diode 50. As is well known, light produced by a laser diode, such as the diode 50, is elliptical in cross-section, due to the geometry of the laser diode emitting area. Further, the elliptical cross-section source light 55 rapidly diverges as it propagates from the laser diode. The divergence of the source light 55 is corrected by the collimating lens system 51, so that the source light 55 enters the prism 10 in the form of parallel rays, rather than diverging rays, to provide a collimated input beam portion 56. The prism 10 preferentially magnifies the source light 55 to convert the elliptical cross-section input beam portion 56 to a circular a cross-section output light beam portion 57, either by expansively magnifying the elliptical light input beam 56 along the minor axis of the ellipse, or by compressively magnifying the input light beam 56 along the major axis of the ellipse. The shaping device in FIGS. 3 and 4 may be utilized for either expansive or compressive magnification through proper orientation of the prism 10 relative to the laser diode 50. In FIGS. 3 and 4, the prism 10 is oriented for expansive magnification, and the magnification ratio is about 2:1.

The cross-sectional shape of the collimated input light beam 56 entering the prism 10, and that of the output beam 57 leaving the prism 10, are shown schematically in FIGS. 5 and 6, respectively, in reference to a coordinate system having mutually orthogonal X, Y and Z axes. The Y axes and Z axes for the input beam 56 and output beam 57, respectively, are within the planes of incidence of the input face 26 and output face 30, respectively. The Y axes in FIGS. 5 and 6, respectively, are perpendicular to the direction of the input and output light beams 56, 57, respectively, while the Z axes in FIGS. 5 and 6, respectively, are parallel to the direction of the input and output light beams 56, 57 respectively. The X axes in FIGS. 5 and 6, respectively, are perpendicular to the direction of the input and output light beams, respectively, and to the planes of incidence of the faces 26, 30, respectively. In the preferred embodiment, the Z axes of FIGS. 5 and 6 lie along a common line.

Those skilled in the art will understand that the plane of incidence of a surface is that plane within which (1) the incident ray, (2) the refracted (or reflected) ray, and (3) a line normal to the surface at the point of incidence lie. The planes of incidence for the faces 26, 30 are parallel to the plane of the sheet of paper in FIG. 3 and perpendicular to the sheet of paper in FIG. 4. The central ray 64 of the light beam lies within the planes of incidence of the faces 26, 30.

Referring to FIG. 5, which illustrates the elliptical cross section light 56 leaving the collimator 51 and entering the input face 26 of the prism 10, it will be seen that the minor axis of the ellipse 56 has a dimension $d_y$, and is oriented along the Y axis, while the major axis of the ellipse 56 has a dimension $d_x$, and is oriented along the X axis. The boundaries of the collimated light beam along the minor axis are illustrated in FIG. 3 by the rays 60, 61 while the boundaries of the light along the major axis are illustrated by the rays 62, 63 in FIG. 4. The central ray of the light beam is illustrated in FIGS. 3 and 4 by the reference numeral 64. Although the central ray 64 is shielded from view by the ray 60 in FIG. 4 and by the ray 63 in FIG. 3, it will be understood that this central ray 64 is at the center of the beam 55, and defines the geometric center line thereof. Further, the central ray 64 is coincident with the Z axes for the input beam portion 56 and the output beam portion 57.

As indicated above, the prism 10 is oriented relative to the diode 50 input beam such that the minor axis of the ellipse 56 (FIG. 5) lies in the plane of incidence of the surface 26. This orientation of the prism 10 relative to the input beam 56 causes the beam to be magnified exclusively along the minor axis, with no magnification along the major axis, as the beam 56 is refracted at the surface 26. Such refraction at the surface 26 causes the rays 60, 61, 62, 63, and 64 to propagate towards the surface 28, where the rays 60, 61, 62, 63, and 64 are totally internally reflected for propagation to the output face 30. Total internal reflection at the surface 28 is preferably achieved without coatings, by making the angle of an incidence of the rays 60, 61, 62, 63, and 64 at the surface 28 greater than the critical angle. However, reflection may also be achieved by coating the surface 28 with a reflecting material. When the rays 60, 61, 62, 63, and 64 reach the output face 30, they are refracted by an amount sufficient to cause the rays 60, 61, 62, 63, and 64 exiting the face 30 to be parallel to the rays 60, 61, 62, 63, and 64 entering the face 26. The refraction at the output face 30 causes some compressive magnification of the light beam, however, this compressive magnification is more than offset by the expansive magnification at the input face 26, such that the overall magnification is expansive. The overall amount of magnification of the prism 10 is equal to the product of the magnifications at the input and output faces 26, 30. Preferably, such overall magnification is sufficient to expansively magnify the input light 56 along the minor axis dimension (e.g. the Y axis is FIG. 5) by an amount such that the minor axis dimension $d_y$ and major axis dimension $d_x$ are equal, as shown in FIG. 6, thereby yielding the circular cross-section light 57 at the output of the prism 10. Thus, through proper orientation of the prism relative to the input beam 56, and through proper choice of the prism angles, $\alpha$, $\beta$, and $\gamma$, the elliptical cross-section input beam 56 (FIG. 5) may be transformed into a circular cross-section output beam 57 (FIG. 6).

The selection of prism angles and proper orientation of the prism may be more fully understood through reference to FIG. 7, which schematically depicts the prism 10 with a single light beam 70 propagating therethrough. For clarity of illustration, only the central ray of the beam 70 is shown, and thus, magnification of the beam 70 is not illustrated. However, it will be understood that the beam 70 is magnified as discussed in reference to FIGS. 3-6. As shown in FIG. 7, the beam 70 is refracted at the input face 26, reflected at the reflecting face 28 and refracted at the output face 30. The overall magnification $M_t$ of the beam 70 as it passes through the prism 10 may be defined as follows:

$$M_t = (M_i)(M_o) \quad (1)$$

where: $M_i$ is the magnification at the input face 26, and $M_o$ is the magnification at the output face 30.

The magnification $M_i$ may be defined as:

$$M_i = \cos R_1 / \cos I_1 \quad (2)$$

where: $I_1$ is the angle of incidence of the beam 70 relative to the input face 26, and $R_1$ is the angle of refraction of the beam 70 relative to the input face 26.

Similarly, the magnification $M_o$ may be defined as:

$$M_o = \cos R_2 / \cos I_2 \quad (3)$$

where: $I_2$ is the angle of incidence of the beam 70 relative to the output face 30; and $R_2$ is the angle of refraction of the beam 70 relative to the output face 30, as shown in FIG. 7.

Substituting equations (2) and (3) into equation (1) yields:

$$M_t = (\cos R_1 / \cos I_1)(\cos R_2 / \cos I_2) \quad (4)$$

A desired magnification for the prism 10 may thus be achieved through selection of the angles of incidence for the particular prism material in accordance with Equations (1)-(4).

The prism angles $\alpha$, $\beta$, and $\gamma$ should preferably be selected such that the direction of the light output from the prism is parallel to the direction of light input to the prism. In FIG. 7, the central ray of the input light is shown as propagating along an input propagation axis 72, while the central ray of the light output from the prism 10 is shown as propagating along an output axis 74, which is parallel to the input axis 72. These propagation axes 72, 74 correspond to the Z axes discussed in reference to FIGS. 5 and 6.

Parallelism between the input and output propagation axis 72, 74 may be achieved by selecting the prism angles to satisfy the following relationships:

$$\alpha = 180° - I_1 - U \quad (2)$$

$$\beta = U - R_2 \quad (3)$$

$$\gamma = 180° - \alpha - \beta \quad (4)$$

where: U is the angle between a line parallel to the input propagation axis 72 and the portion of the beam 70 between the reflecting face 28 and output face 30, as shown in FIG. 7.

Although satisfying the above relationships will maintain parallelism between the input and output propagation axes 72, 74, it is preferable that these axes be not only parallel, but also colinear, i.e. lie along a common line. Such colinearity is achieved by properly sizing the prism length, i.e. the dimension L of the prism between the points of incidence 76, 80 of the central ray of the beam 70 on the faces 26, 30, respectively. The points of incidence 76, 80 are the points of intersection of the propagation axes, 72, 74 with the faces 26, 30, respectively. Colinearity of the axes 72, 74 will be achieved when the length L is selected such that the the central ray of the light beam 70 and the input axis of propagation 72 intersect at a common location on the output face 30, e.g., at the point of incidence 80. Although the length L in FIG. 7 yields such colinearity of the axes 72, 74, it will be seen that, if the prism 10 were lengthened such that the exit face 30 were coincident with the phantom line 30' (which is parallel to the exit face 30), the point of incidence 80 on the exit face 30 would be shifted downward by an amount D to the point 80', yielding a prism length of L'. Such lengthening of the prism also causes the output propagation axis 74 to be shifted downward by the distance D to the axis 74', such that the input and output axes 72, 74' are no longer colinear, and thus, the input and output beams are no longer colinear. If the prism were shortened, rather than lengthened, the axis 74 would be shifted upward rather than downward, and the input and output beams would also no longer be colinear. Thus, the prism length has a direct effect on the colinearity of the input and output beams.

Accordingly, for a prism material of a given refractive index, the angles of incidence determine the magnification, the prism angles determine the parallelism of the input and output propagation axes 72, 74, and the length L of the prism determines the colinearity of the propagation axes 72, 74.

Returning now to Equation (4), it will be understood that, for a particular prism material, a variety of combinations of the angles of incidence, and thus, a variety of combinations of magnifications at the input and output surfaces 26, 30, may be utilized to achieve a given overall magnification. For a given prism material refractive index, there is an optimum combination of incidence angles and magnifications that will minimize the Fresenel reflection losses at the input and output faces 26, 30 of the prism 10. Specifically, the angles of incidence should be selected such that they are close as possible to the Brewsters angles for the surfaces 26, 30, while still providing the desired magnification. To the extent that the angles of incidence match the Brewsters angles, the transmission through the faces 26, 30 will be lossless, thus eliminating the need for any antireflection coatings on the surfaces 26, 30.

The relationship among reflection, transmission, and angles of incidence is illustrated more fully in FIGS. 8 and 9, both of which illustrate reflected light intensity at a surface as a function of the angle of incidence for a material (e.g. glass) having a refractive index of about 1.5. Note, however, that the graph of FIG. 8 is for an air to glass boundary (e.g. the face 26), while the graph of FIG. 9 is for a glass to air boundary (e.g. the face 30). Further, the curve 82 (FIG. 8), and the curve 84 (FIG. 9) are representative of light which is polarized in a direction which is parallel to the plane of incidence of the surface which forms the glass to air or air to glass boundary, while the curve 86 (FIG. 8), and the curve 88 (FIG. 9) represent light which is polarized in a direction perpendicular to the plane of incidence of the surface. It will be seen from FIGS. 8 and 9 that the reflection of light from a surface is lowest when the light is polarized in a direction parallel to the plane of incidence, as represented by the curves 82, 84.

Referring back to FIGS. 5 and 6, the polarization of the light from the laser diode 50 (FIG. 3) is parallel to the minor axis of the ellipse 56 (FIG. 5), as represented by the arrows which depict the direction of the electric field vector. It will be recalled from the discussion in reference to FIGS. 3 and 4 that the laser diode 50 was oriented such that the minor axis of the ellipse 56 was coincident with the plane of incidence of the input face 26. Thus, the light 56 input to the prism in the embodiment of FIGS. 3 and 4 was polarized in a direction parallel to the plane of incidence, and accordingly, the curves 82, 84 of FIGS. 8 and 9, respectively, apply in determining the amount of reflection at the surfaces 26, 30. Referring first to the curve 82 of FIG. 8, the reflected light is at a minimum at the Brewster angle of 56°, and is very low for angles of incidence below the Brewster angle. Above the Brewster angle, the reflection increases and total reflection occurs at an angle of 90°. Similarly, the curve 84 of FIG. 9 indicates that reflection is at a minimum at the Brewster angle of 34°, and is quite low below the Brewster angle. However, above the Brewster angle the curve 84 rises very rapidly, and total internal reflection occurs at an angle of incidence of only about 42°. Accordingly, it is most preferably to select the angles of incidence $I_1$ and $I_2$ so that they are equal to the Brewster angles of 56° and 34°, respectively. However, if the particular prism design does not allow for use of Brewster's angles, it is more preferable to have the angle of incidence less than the Brewster angle than greater than the Brewster angle, although the curves 82, 84 indicate that this is more important in regard to the glass-air boundary (e.g. the face 30) than the air-glass boundary (e.g. the face 26).

For a common crown glass, such as Schott BK7, with an index of refraction of 1.51119 at a typical lasear wavelength of 780 nm, a prism magnification $M_t$ of 2.0 could be achieved utilizing a prism having an angle $\alpha$ equal to 27.912° and a prism angle $\beta$ equal to 41.388°. Under these conditions, the incidence angle $I_1$ is equal to about 70.7° and the incidence angle $I_2$ is equal to about 25°. The Brewster's angle for an air glass boundary, such as at the surface 26, is about 56°, while the Brewster's angle for a glass to air boundary, such as at the surface 30, is about 34°. For this exemplary prism, the angles of incidence $I_1$, $I_2$ are sufficiently close to the Brewster's angles of 56° and 34°, respectively, that the overall reflection losses through the prism without any coatings are only about 3.17%. In addition, no coatings are required on the reflecting face 28, since the angle of incidence at the reflecting face for this exemplary prism is about 66.5°, which is greater than the critical angle of 42° for a glass to air boundary.

As shown in FIG. 10, the prism 10 may also be oriented for compressive magnification so that the elliptical cross-section input light 56 is compressed along its major axis to yield circular cross-section light 57. Such compression is illustrated in FIGS. 11 and 12, which show the cross-sectional shape of the input beam 56 and the output beam 57, respectively. Note that the light beam in FIGS. 11 and 12 is cross-sectionally illustrated in reference to the X, Y, Z coordinate system discussed in reference to FIGS. 5 and 6, wherein the Y axis is in the plane of the input face, while the X axis is orthogonal to both the Y axis and plane of incidence. In the arrangement shown in FIGS. 10–12, the face 30 serves as the input face, while the face 26 serves as the output face. It will be recalled that the expansive magnification arrangement of FIGS. 3–6 utilize the face 26 as the input face, rather than the face 30, and the face 30 as the output face, rather than the face 26. Thus, in FIG. 10, the light beam travels through the prism in a direction opposite to that shown in FIGS. 3 and 4.

Further, the arrangement of FIG. 10 differs from that of FIGS. 3 and 4 in that light source 50 and prism 10 are rotated 90° relative to each other about the Z axis, so that the major axis of the elliptically-shaped light 56 (FIG. 11) is within the plane of incidence of the input face 30, while the minor axis of the elliptically-shaped input light 56 is orthogonal to the plane of incidence of the input face 30 (compare FIGS. 11 and 12 with FIGS. 5 and 6). The elliptical cross-section input light 56 (FIG. 11) enters the input face 30, where it is expansively magnified slightly and refracted for propagation to the reflecting surface 28, where it is reflected to the output face 26. At the output face 26, the light is compressively magnified along the major axis of the ellipse, so that the output light 57 (FIG. 12) has a circular cross-section. Further, the light is refracted at the output face 26 by an amount which maintains parallelism between the input and output beam portions 56, 57. Moreover, the prism of FIG. 10 is sized, as discussed in reference to FIG. 7, to have a length, L, which causes the input and output beam portions 56, 57 to be colinear. Thus, the embodiment discussed in reference to FIGS. 10-12 provides the same function as the device discussed in reference to FIGS. 3-7, except at the elliptically cross-section light beam 56 is compressed along the major axis, rather than expanded along the minor axis. Further, the prism 10, when oriented as shown in FIG. 10 provides compressive anamorphic magnification equal to the reciprocal of the expansive anamorphic magnification when oriented as shown in FIG. 3. Thus, if the prism provides magnification of 2:1 in the arrangement of FIG. 3, it will provide magnification of 1:2 in the arrangement of FIG. 10. Compressive magnification is highly advantageous for many applications, e.g., where small beam dimensions are important or where increased intensity per unit area is desirable.

If the exemplary prism discussed above is utilized in the arrangement of FIG. 10, the angle of incidence of the input beam at the air to glass interface of the face 30 will be about 40°. The angle of incidence of the beam at the glass to air interface at the output face 26 is about 39°. Referring back to FIGS. 8 and 9, it will be seen that the 40° angle of incidence is below the Brewster angle of 56° for air to glass interface while the 39° angle of incidence is slightly above the Brewster angle of 34°, for a air to glass interface. It will be recalled from the discussion in reference to FIGS. 8 and 9 that the amount of reflection from a surface when the light is polarized in a direction normal to the plane of incidence, (represented by the curves 86, 88) is higher than the amount of reflection when the light is polarized in a direction parallel to the plane of incidence (represented by the curves 82, 84). Laser diodes typically output light polarized in a direction parallel to the minor axis of the ellipse, and thus, the input light 56 in FIG. 10 is polarized in a direction normal to the plane of incidence (see FIG. 11), such that the curves 86, 88 (FIGS. 8 and 9) apply in determining reflection losses. Accordingly, even thhough the angles of incidence at the faces 30, 26 in FIG. 10 are reasonably close to the Brewster's angles, the reflection at the surfaces 30, 26 will be quite high. In such case, it is preferable to provide anti-reflection coatings on the surfaces 30, 26 to reduce reflection losses at the surfaces 30, 26. Of course, no coating is required on the surface 28, so long as the angle of incidence is greater than the critical angle. In the exemplary prism, the angle of incidence at the surface 28 is about 66.5°, which is substantially greater than the critical angle for a glass to air interface of 42°.

Figure 14:
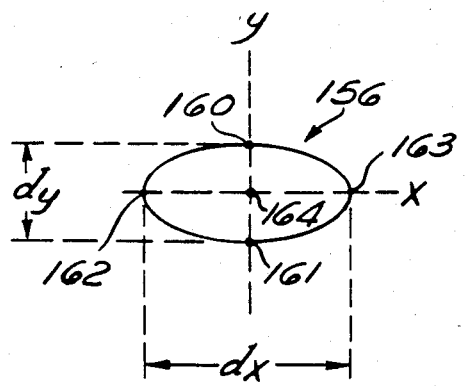
FIG. 14 is a schematic drawing showing the elliptical cross-section light input to the prism of FIG. 13.
Figure 15:
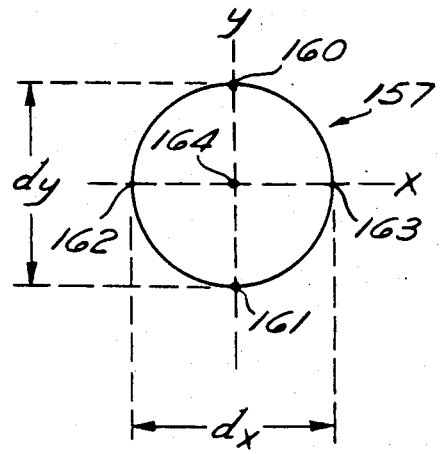
FIG. 15 is a schematic drawing showing the circular cross-section light output from the prism of FIG. 13.

Although the above-described prism 10 represents the preferred embodiment, it will be understood that there is a limit to the magnification that can be achieved utilizing the prism 10. If higher magnifications are desired, the prism 10 may be modified in accordance with an alternative embodiment, depicted in FIG. 13 as the prism 110. In FIG. 13, the prism 110 is oriented relative to the source light beam 155 for expansive anamorphic magnification of the beam 155 along its minor axis, as discussed above in reference to FIGS. 3 to 6. Thus, the input portion 156 of the beam 155 is anamorphically magnified by the prism 110 along the dimension $d_y$ to transform the eliptical cross-section input beam 156 to a circular cross-section output beam 157, as shown in FIGS. 14 and 15. The light beam 155 of FIG. 13 is defined by the rays 160, 161, 162, 163, and 164 in the same manner that the light beam 55 of FIGS. 3 to 6 is defined by the rays 60, 61, 62, 63, and 64, respectively.

The prism 110 of FIG. 13 includes an input face 126, a reflecting face, 128, and an output face 130. In this embodiment, however, the input face 126 includes a transmissive portion 200 for receiving the input light beam 156, and a reflecting portion 202 which serves as a second reflecting face for the prism 110. The input light beam 156 is incident upon the transmissive portion 200, where it is refracted to the reflecting face 128. The beam is then reflected at the reflecting face 128 to the reflecting portion 202 of the input face 126, where it is reflected to the output face 130. The light incident upon the output face 130 is transmitted therethrough, and refracted by an amount such that the propagation axis 174 of the output beam 157 is parallel to the propagation axis 172 of the input beam 156. Preferably, the prism length is selected in accordance with the discussion in reference to FIG. 7 such that the input and output propagation axes 172, 174 are colinear.

It will be seen from FIG. 13 that the reflecting surfaces 128, 202 are non-parallel and gradually diverge relative to each other. Such divergence of the faces 128, 202 cause the rays 60 through 64 to tend towards increasing parallelism with the input propagation axis 172 as the light propagates through the prism 110. Consequently, the amount of compressive magnification at the exit face 130 required to make the propagation axis 174 of the output light beam 157 parallel with the axis 172 of the input axis 172 is decreased, thereby increasing the overall magnification of the prism 110. The foregoing may be understood more fully through reference to the angles q and p in FIG. 13. The angle q is the angle formed between the rays reflected from the first reflecting surface 128 and a line parallel to the input propagation axis 172, while the angle p is the angle formed by the rays reflected from the second reflecting surface 126 and a line parallel to the input propagation axis 172. The divergence between the reflecting surfaces 128, 202 causes the angle p to be smaller than the angle q, and thus, the rays become increasingly parallel to the input propagation axis 172 as the number of reflections increases. This increased parallelism decreases the amount of compressive magnification at the output face 130 required for parallelism of the axes 172, 174. Thus, there is less reduction of the expansive magnification of the input face 126, and the overall magnification of the prism is increased.

The behavior of the light propagating between the two reflecting surfaces 128, 202 is somewhat analogous to that of light propagating through a straight reflecting cone. If the prism were made quite long, so that the rays 60 to 64 underwent a number of additional reflections between the diverging surfaces 128, 202, the rays 60 through 64 would eventually be parallel to the input propagation axis 172, in which case there would be no need for refraction and concomitant demagnification at the output face 130 to provide parallelism of the input and output propagation axis 172, 174. In such case, the overall prism magnification would be equal to the magnification at the input face 126.

While the prism 110 of FIG. 13 is capable of achieving higher magnification than the prism of FIGS. 3 and 4, such increased magnification is accomplished only at the sacrifice of increased prism size. Thus, the embodiment of FIGS. 3 and 4 is preferred, particularly for applications where compactness is important.

It will be recognized that, although the embodiment of FIG. 13 was described in terms of expansively magnifying the light along the minor axis of the elliptical cross-section light, as discussed above in reference to FIGS. 3 and 4, the prism 110 may also be oriented for compression along the major axis of the elliptical cross-section light, as discussed in reference to FIG. 10 to yield compressive magnification of the light beam. Further, those skilled in the art will understand that, depending upon the angles of incidence with respect to the surfaces 126, 128, and 130, it may be desirable or necessary to provide reflection coatings on the surfaces 202 and/or 128, and to provide anti-reflection coatings on the surface 200 and/or the surface 130.

The preferred collimation lens system 51 for use with the anamorphic prism of the present invention is shown in detail in FIG. 16. This collimation lens system 51 comprises a flat plate 52, a positive meniscus lens 53, and a positive lens element 54. In the embodiment shown, the lens 53 is an aplanatic form a positive meniscus lens, and the lens 54 is a positive meniscus lens (not aplanatic). As shown in FIG. 16, the lens 53 is disposed between the plate 52 and the lens 54. In an exemplary lens system, the optical elements 52, 53, 54 were all formed from glass, such as schott SF11, having an index of refraction of 1.785 and a dispersion or Abbe number of 25.8. This exemplary lens system was designed to have a focal length of 8.019 mm, and a numerical aperture of 0.5 for a wavelength of 830 nm. The wavefront aberration was equal to 1/16 of the wavelength. In this exemplary design, the flat plate was 4 mm thick, and the lenses 53, 54 were each 2.5 mm thick along the optic axis 90. The radius of curvature $R_1$ of the spherical outer surface of the lens 54 was 9.789 mm, while the radius of curvature $R_2$ of the spherical inner surface of the lens 54 was 79.434 mm. The radius of curvature $R_3$ of the spherical outer surface of the lens 53 was 5.491 mm, while the radius of curvature $R_4$ of the spherical inner surface of the lens 53 was 6.949 mm. The lenses 53, 54 were separated by an air space 92 of 0.2 mm, measured along the optic axis 90, while the lens 53 and the flat plate 52 were separated by air space 94 of 1 mm, measured along the optic axis 90. This combination of elements yields a back focal length $f_b$ of 1.577 mm for the source light.

In general, the flat plate 52 is sized to introduce sufficient negative spherical aberration to cancel the positive spherical aberration of the lens 54. This collimator 51 is quite advantageous in that it can be adjusted to accommodate various wavelengths simply by changing the thickness of the plate 52.

Although the above-described collimator is preferred, it will be understood that various types of commercially available collimators are also appropriate for use with the prism of the present invention.

What is claimed is:

1. An apparatus, comprising:
   a single, unitary anamorphic prism having an input face for receiving a beam of light and an output face for outputting said beam of light, said faces oriented to cause anamorphic magnification of said beam of light and further oriented to cause said beam at said output face to be substantially parallel to said beam at said input face.

2. An apparatus, as defined by claim 1, wherein said prism is sized to cause said beam at said output face to be substantially colinear with said beam at said input face.

3. An apparatus, as defined by claim 1, wherein said prism includes a reflecting face, said faces further oriented such that said beam is refracted twice and reflected once during passage through said prism.

4. An apparatus, as defined by claim 1, wherein said faces are oriented to cause expansive magnification at one of said faces and compressive magnification at the other of said faces.

5. An apparatus, as defined by claim 1, wherein said beam of light has two orthogonal cross-sectional dimensions, and wherein said prism preferentially magnifies one of said dimensions without magnifying the other.

6. An apparatus, as defined by claim 1, additinally comprising a collimator, said collimator comprising a flat plate, a meniscus lens, and a positive lens element.

7. An apparatus, as defined by claim 1, wherein at least one of said input and output faces is oriented such that the angle of incidence of said light beam thereon is substantially equal to or less than Brewster's angle.

8. An apparatus, as defined by claim 1, wherein said anamorphic magnification is expansive.

9. An apparatus, as defined by claim 1, wherein said anamorphic magnification is compressive.

10. An apparatus, as defined in claim 1, wherein said single anamorphic prism additionally comprises a reflecting face.

11. An apparatus, as defined by claim 10, wherein said input, output, and reflecting faces are uncoated.

12. An apparatus, as defined by claim 10, wherein said prism additionally comprises a second reflecting face.

13. An apparatus, as defined by claim 12, wherein said second reflecting face comprises a portion of said input face.

14. An apparatus, comprising:
   a single anamorphic prism for shaping a beam of light, said prism comprising first, second, and third surfaces, said first surface exclusively for refracting said beam of light, said second surface exclusively for reflecting said beam of light, and said third surface exclusively for refracting said beam of light, said surfaces cooperating to anamorphically magnify said beam of light.

15. A prism for shaping a beam of light input thereto, said prism comprising:
   first, second and third planar surfaces lying in first, second, and third mutually-intersecting planes, respectively, said first and second planes intersecting at an obtuse angle $\gamma$, said first and third planes intersecting at an acute angle $\alpha$, said second and third planes intersecting at an acute angle $\beta$, said acute angle $\alpha$ different from said acute angle $\beta$, said angles selected to provide an output light beam which is parallel to said input light beam.

16. A prism for shaping a beam of light as defined in claim 15, wherein said first surface is oriented to receive said light beam and transmit said light beam to said third surface, said third surface is oriented to reflect said light beam to said second surface, said angles $\alpha$, $\beta$, and $\gamma$ defined by:

$$\alpha = 180° - I_1 - U;$$

$$\beta = U - R_2;$$

and $$\gamma = 180° - \alpha - \beta$$

where $I_1$ is the angle of incidence of said light beam at said first surface; $R_2$ is the angle of refraction of said light beam at said second surface; and U is the acute angle betweem (1) the axis of propagation of the light beam received by said first surface and (2) the light beam reflected from said third surface to said second surface.

17. An apparatus, comprising:
a single anamorphic prism, for receiving a light beam, said prism having an input face, a reflecting face, and an output face, said reflecting face reflecting said light beam from said input face to said output face, said input, output, and reflecting face oriented to cause magnification of said beam of light;
a light source for inputting light to said input face along an axis of propagation; and
said prism sized such that the central ray of said reflected light beam and said axis of propagation intersect said output face at a common location.

18. An apparatus, comprising:
a single anamorphic prism for receiving a light beam, said prism having an input refracting face, a reflecting face, and an output refracting face, said faces oriented for anamorphic magnification of said light beam, said input refracting face refracting said light beam to said reflecting face, said reflecting face reflecting said light beam to said output refracting face, said output refracting face refracting said light beam to output said light beam from said prism, said reflecting face oriented so that the angle of incidence of said light beam thereon is greater than the critical angle, at least one of said refracting faces oriented such that the angle of incidence of said light beam thereon is substantially equal to or less than the Brewster's angle.

19. A method of transforming an input light beam having an elliptical cross section to an output light beam having a circular cross section, said method comprising;
passing said input light beam through an anamorphic prism to cause preferential magnification of said input light beam along one of the major and minor axes of said elliptical cross section to provide said output light beam of circular cross section;
orienting the active faces of said prism relative to said light beam to cause said input and output beams to be parallel; and
positioning the active faces of said prism relative to each other and to said light beam to cause said input and output beams to be colinear.

20. A method of transforming a light beam, as defined by claim 19, additionally comprising the step of polarizing said input light beam in a direction parallel to the plane of incidence of the active faces of said prism.

21. A method of manufacturing an anamorphic prism, comprising:
forming first, second, and third surfaces on a single, unitary piece of transparent material to provide an input face for receiving an input beam of light, a reflecting face for reflecting a beam of light, and an output face for receiving a beam of light from the reflecting face and for outputting a beam of light, said surfaces lying in respective, mutually intersecting planes; and
selecting the angles between said surfaces for anamorphic magnification of the input beam of light.

22. A method of manufacturing an anamorphic prism, as defined by claim 21, wherein two of said surfaces have on angle $\alpha$ therebetween and two of said surfaces have an angle $\beta$ therebetween said angles $\alpha$ and $\beta$ defined by:

$$\alpha = 180° - I_1 - U;$$

and $$\beta = U - R_2$$

where $I_1$ is the angle of incidence of a light beam received by one of the first and second surfaces, $R_2$ is the angle of refraction of a light beam received at the other of the first and second surfaces, and U is an angle between the axis of propagation of the input beam of light and the beam of light reflected from the reflecting face.

23. An apparatus, as defined by claim 10, wherein said input face is oriented to receive said light beam and transmit said light beam to said reflecting face, and said reflecting face is oriented to reflect said light beam to said output face, said faces lying in first, second, and third mutually-intersecting planes, said first and second planes intersecting at an obtuse angle $\gamma$, said first and third planes intersecting at an acute angle $\alpha$, said second and third planes intersecting at an acute angle $\beta$, said angles $\alpha$, $\beta$, and $\gamma$ related by:

$$\alpha = 180° - I_1 - U;$$

$$\beta = U - R_2;$$

and $$\gamma = 180° - \alpha - \beta$$

where $I_1$ is the angle of incidence of said light beam at said input face; $R_2$ is the angle of refraction of said light beam at said output face, and U is the acute angle between the axis of propagation of the light beam received by the input face and the light beam reflected from said reflecting face to said output face.

24. A method of manufacturing an anamorphic prism comprising:
forming input and output faces on a single, unitary piece of transparent material, said forming step including the steps of (1) orienting said faces such that an input light beam which is input to said input face is anamorphically magnified to form an output light beam which is output from said output face, and (2) orienting said faces such that input and output beams are parallel.

25. A method, as defined by claim 24, additionally comprising the step of relatively locating said faces so that said input and output beams are colinear.

26. An apparatus comprising:
a unitary anamorphic prism having active faces only on the exterior thereof, said active faces including an input face for receiving a beam of light and an output face for outputting said beam of light, said faces oriented to cause anamorphic magnification of said beam of light and further oriented to cause said beam at said output face to be substantially parallel to said beam at said input face.

27. An apparatus as defined by claim 26, wherein said prism is sized to cause said beam at said output face to be substantially colinear with said beam at said input face.

* * * * *